United States Patent
Hoelen et al.

(10) Patent No.: US 6,854,854 B2
(45) Date of Patent: Feb. 15, 2005

(54) ILLUMINATION SYSTEM AND DISPLAY DEVICE

(75) Inventors: Christoph Gerard August Hoelen, Eindhoven (NL); Gerard Harbers, Best (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 43 days.

(21) Appl. No.: 10/117,585

(22) Filed: Apr. 5, 2002

(65) Prior Publication Data

US 2002/0163791 A1 Nov. 7, 2002

(30) Foreign Application Priority Data

Apr. 10, 2001 (EP) .............................................. 01201323

(51) Int. Cl.[7] ................................................ F21V 7/05
(52) U.S. Cl. .......................... 362/27; 362/31; 362/231; 362/330; 362/561
(58) Field of Search .............................. 362/27, 26, 31, 362/231, 235, 237, 240, 330, 551, 561, 800, 812; 349/65; 40/444

(56) References Cited

U.S. PATENT DOCUMENTS

| | | | | | |
|---|---|---|---|---|---|
| 2,623,313 A | * | 12/1952 | Fuchs | .......................... | 40/546 |
| 5,883,474 A | * | 3/1999 | Kim | .......................... | 315/241 S |
| 5,998,925 A | * | 12/1999 | Shimizu et al. | ............. | 313/503 |
| 6,308,444 B1 | * | 10/2001 | Ki | ................................. | 40/546 |
| 2001/0049893 A1 | * | 12/2001 | Maas et al. | .................... | 40/544 |
| 2002/0145860 A1 | * | 10/2002 | Lee | .............................. | 362/26 |

FOREIGN PATENT DOCUMENTS

WO  WO9105202  4/1991  ............. F21V/8/00

* cited by examiner

*Primary Examiner*—Sandra O'Shea
*Assistant Examiner*—Mark Tsidulko (57) ABSTRACT

A backlight system includes at least first and second light-emitting panels (1; 11) having a front wall (2; 12), an opposing rear wall (3; 13) and opposite edge surfaces (4, 14; 5, 15). At least one of the edge surfaces (4; 14) is light-transmitting and associated with a light source (6; 16). Light originating from the light source is diffused in the light-emitting panels and coupled out of the light-emitting panels in the direction of a display device (25), preferably a LCD device. The light source associated with the first light-emitting panel (1) has clusters of red and blue or red and green LEDs. The light source (16) associated with the second light-emitting panel (11) has clusters of blue and green LEDs or only green LEDs.

22 Claims, 4 Drawing Sheets

ILLUMINATION SYSTEM AND DISPLAY DEVICE

The invention relates to an illumination system for illuminating a display device, which illumination system is provided with a light-emitting panel comprising
a front wall, a rear wall situated opposite said front wall, and edge areas between the front wall and the rear wall,
at least one of the edge areas of the panel being light-transmitting,
at least one light source being associated with the light-transmitting edge area, and
in operation, light originating from the light source being incident on the light-transmitting edge area and spreading in the panel.

The invention also relates to a display device comprising said illumination system.

Such illumination systems are known per se and are alternatively referred to as edge lighting systems. They are used, inter alia, as a backlighting of (image) display devices, for example for television receivers and monitors. Such illumination systems can particularly suitably be used as backlights for non-emissive displays, such as liquid crystal display devices, also referred to as LCD panels, which are used in (portable) computers or (cordless) telephones.

Said display devices generally include a substrate provided with a regular pattern of pixels, which are each driven by at least one electrode. In order to reproduce an image or a datagraphic representation in a relevant area of a (display) screen of the (image) display device, the display device uses a control circuit. In an LCD device, the light originating from the backlight is modulated by means of a switch or a modulator, while applying various types of liquid crystal effects. In addition, the display may be based on electrophoretic or electromechanical effects.

In the illumination systems mentioned in the above paragraphs, customarily a tubular low-pressure mercury vapor discahrge lamp, for example one or more cold cathode fluorescent lamps (CCFL) are used as the light source. The light which is emitted, in operation, by the light source is coupled into th optical waveguide generally forms a comparatively thin and flat panel which is made, for example, of a synthetic resin material or glass, light being transported through the optical waveguide under the influence of (total) internal reflection.

Such an illumination system may also be provided with an alternative light source in the form of a plurality of opto-electronic elements, also referred to as electro-optic elements, such as electroluminescent elements, for example light-emitting diodes (LEDs). These light sources are generally provided in the proximity of, or are contiguous with, a light-transmitting edge area of the light-emitting panel, so that, in operation, light originating from the light source is incident on the light-transmitting edge area and spreads in the panel.

EP-A 446 324 discloses an illumination system which enables an LCD panel to be illuminated at different types of ambient light. For the light source use is made of incandescent lamps which couple light into a light-emitting panel, also referred to as light pipe. In the light-emitting panel, multiple reflections of light bring about a light distribution to illuminate the LCD panel.

An illumination system of the type mentioned hereinabove has the disadvantage that the light distribution in the light-emitting panel, particularly in the proximity of the light source, is insufficiently uniform. As a result, the illumination uniformity of the display device is insufficient.

It is an object of the invention to completely or partly overcome the above-mentioned drawback.

In accordance with the invention, this object is achieved in that
the illumination system comprises a first light-emitting panel and a second light-emitting panels are arranged so as to be at least substantially paralles,
the light source associated with the light-transmitting edge area of the first light-emitting panel comprising two light-emitting diodes having a first and a second light-emission wavelength,
the light source associated with the light-transmitting edge area of the second light-emitting panel comprising a light-emitting diode having a third light emission wavelength, or two light-emitting diodes, one of the light-emitting diodes including a light-emitting diode having a third light emission wavelength, and
the first, the second and the third light emission wavelength being different.

The use of more than one light-emitting panel in the illumination system in accordance with the invention has the advantage that the light-transmitting edge areas of the first light-emitting panel are associated with (at the most) two LEDs having different light emission wavelengths, and that the light-transmitting edge areas of the second light-emitting panel are associated with one or (at the most) two LEDs. If three LEDs of different colors, for example clusters of (alternately) red, green and blue LEDs, would be associated with the light-transmitting edge area of a light-emitting panel, then comparatively much more space is necessary to mix the light originating from the LEDs to a sufficient degree. By coupling light originating from maximally two types of LEDs into one light-emitting panel, and coupling light originating from one or maximally two types of LEDs into the other light-emitting panel, the space necessary to mix light is reduced substantially.

By virtue of the measure in accordance with the invention, the uniformity of the distribution of the light emitted by the illumination system is improved. As a result, a more uniform illumination of the (image) display device is obtained. In addition, an illumination system in accordance with the invention enables a more compact illumination system having the same light uniformity to be obtained as compared to an illumination system wherein three LEDs of different colors are associated with the light-emitting panel.

A further advantage of the application of multiple light panels resides in that the light output and the light distribution of each of the panels can be influenced individually.

Preferably, a plurality of LEDs, for example clusters of alternately blue and green, red and green or blue and red LEDs, are associated with the light-transmitting edge area of the first light-emitting panel. Preferably, a plurality of LEDs, for example only green LEDs or clusters of alternately red and green, or alternately blue and green LEDs, are associated with the light-transmitting edge area of the second light-emitting panel.

The amount of light emitted by the LEDs is regulated by varying the luminous flux of the light-emitting diodes. Regulating the luminous flux generally takes place in an energy-efficient manner. For example, LEDs can be dimmed without a noticeable decrease in efficiency. Preferably, the intensity of the light emitted by the light-emitting diodes is variable in response to the illumination level of an image to be displayed by the display device, or in response to the level of the ambient light. Preferably, the color point of an image displayed by the display device is determined by the illumination system. By virtue thereof, a(n) (improved)

dynamic range (for example contrast) of the image to be displayed by the display device is obtained.

An alternative embodiment of the illumination system is characterized in that the illumination system comprises a first light-emitting panel, a second light-emitting panel and a third light-emitting panel, which first, second and third light-emitting panels are arranged so as to be at least substantially parallel to each other, the light source associated with the light-transmitting edge area of the first light-emitting panel comprising a light-emitting diode having a first light emission wavelength, the light source associated with the light-transmitting edge area of the second light-emitting panel comprising a light-emitting diode having a second light emission wavelength, the light source associated with the light-transmitting edge area of the third light-emitting panel comprising a light-emitting diode having a third light emission wavelength, and the first, the second and the third light emission wavelength being different.

This enables the dimensions of the light-emitting panels to be further reduced as the space needed for mixing light is small.

By virtue of the measure in accordance with the invention, the light emitted by the illumination system is more uniformly distributed. As a result, a more uniform illumination of the (image) display device is obtained. In addition, compared to an illumination system wherein three LEDs of different color are associated with the light-emitting panel, an illumination system in accordance with the invention enables a (laterally) more compact illumination system having the same light uniformity to be obtained.

Preferably, in the alternative embodiment of the illumination system, the light-transmitting edge areas are alternately situated at opposite sides of the light-transmitting panels.

Preferably, the light source associated with the light-transmitting edge area of the first light-emitting panel comprises a plurality of red light-emitting diodes, the light source associated with the light-transmitting edge area of the second light-emitting panel comprises a plurality of green light-emitting diodes, and the light source associated with the light-transmitting edge area of the third light-emitting panel comprises a plurality of blue light-emitting diodes.

In alternative embodiments of the illumination system, the colors associated with the light-emitting panels are interchanged.

In further alternative embodiments of the illumination system, apart from LEDs having a specific light emission wavelength, LEDs are used which are provided with a phosphor, as a result of which the light emission of the light emitted by the LED is converted by said phosphor to light having a different, desired light emission wavelength. A combination of red LEDs and phosphor LEDs can particularly suitably be used to produce the other colors.

In further alternative embodiments of the illumination system, different ratios of LEDs having a specific light emission wavelength are used, for example, in dependence upon the efficacy of the LEDs. In a particularly suitable illumination system, the ratio between red (R), green (G) and blue (B) LEDs is 2:1:1. A first example of LEDs having a R:G:B ratio of 2:1:1 is a first light-emitting panel comprising only red LEDs, while the second light-emitting panel comprises alternately green and blue LEDs. A second example of LEDs having a R:G:B ratio of 2:1:1 is a first light-emitting panel wherein only red LEDs alternate with blue LEDs, while the second light-emitting panel comprises alternately red and blue LEDs. In an alternative embodiment, the ratio between red (R), green (G) and blue (B) LEDs in the illumination system is 1:1:2. A first example of LEDs having a R:G:B ratio of 1:1:2 is a first light-emitting panel comprising alternately red and green LEDs, while the second light-emitting panel comprises only blue LEDs. A second example of LEDs having a R:G:B ratio of 1:1:2 is a first light-emitting panel comprising alternately red and blue LEDs, while the second light-emitting panel comprises alternately green and blue LEDs. The above-mentioned embodiments are to be construed as examples only. Many other combinations of ratios of differently colored LEDs are possible. It is also possible to apply LEDs provided with suitable phosphors.

Preferably, each one of the light-emitting diodes has a luminous flux of at least 5 lm. LEDs having such a high output are also referred to as LED power packages. The use of these high-efficiency, high-output LEDs has the specific advantage that, at a desired, comparatively high light output, the number of LEDs may be comparatively small. This has a positive effect on the compactness and the efficiency of the illumination system to be manufactured.

The use of LEDs has the further advantage that dynamic illumination possibilities are obtained. For this purpose, a sensor for measuring the optical properties of the light emitted, in operation, by the light source is preferably situated at a light-transmitting edge area. If different types of LEDs are combined and/or LEDs of different colors are employed, it is possible to mix colors in a desirable manner, for example, to enable the illumination system to emit white light of the desired color temperature. In addition, color changes can be brought about irrespective of the condition of the display device.

In order to save space, the light panels are preferably arranged one behind the other. The front wall or, preferably, the rear wall of the light-emitting panels is provided with means for coupling light out of the panel. These means for coupling out light are alternatively referred to as coupling-out members. These means, which are known per se, comprise (patterns of) deformations. Said means couple light out of the light-emitting panels by reflection, scattering and/or refraction. Generally, the means for coupling out light are distributed non-uniformly over the rear wall of the relevant light-emitting panel, i.e. they are provided at a predetermined gradient allowing light to be coupled out of the relevant light-emitting panel as uniformly as possible.

The first light-emitting panel, which is situated closest to the display device, allows passage of light originating from the second light-emitting panel, which is situated on the side of the first light-emitting panel facing away from the display device. In an alternative embodiment, the second light-emitting panel is arranged between the first light-emitting panel and the display device.

It is particularly favorable if the light-transmitting edge areas are alternately situated at opposite sides of the first and the second light-transmitting panel. This enables any influence of the light originating from gradients in the distribution of the means for coupling light out of the light-emitting panel to be compensated since the gradients extend in the same (yet opposite) direction. This can be achieved in a similar manner for three sequentially arranged light-emitting panels.

An embodiment of the illumination system is characterized in that the illumination system comprises control electronics for changing the luminous flux of the light-emitting diodes. Suitable control electronics enables the desired color temperature effects to be attained. Particularly suitably, the control electronics can be influenced by the user of the assembly, by means of a sensor that measures, for example, the color temperature of the ambient light, or by means of a video card of, for example, a (personal) computer and/or by means of drive software of a computer program.

These and other aspects of the invention will be apparent from and elucidated with reference to the embodiment(s) described hereinafter.

In the drawings.

The Figures are purely diagrammatic and not drawn to scale. Particularly for clarity, some dimensions are exaggerated strongly. In the Figures, like reference numerals refer to like parts whenever possible.

Figure 1A:
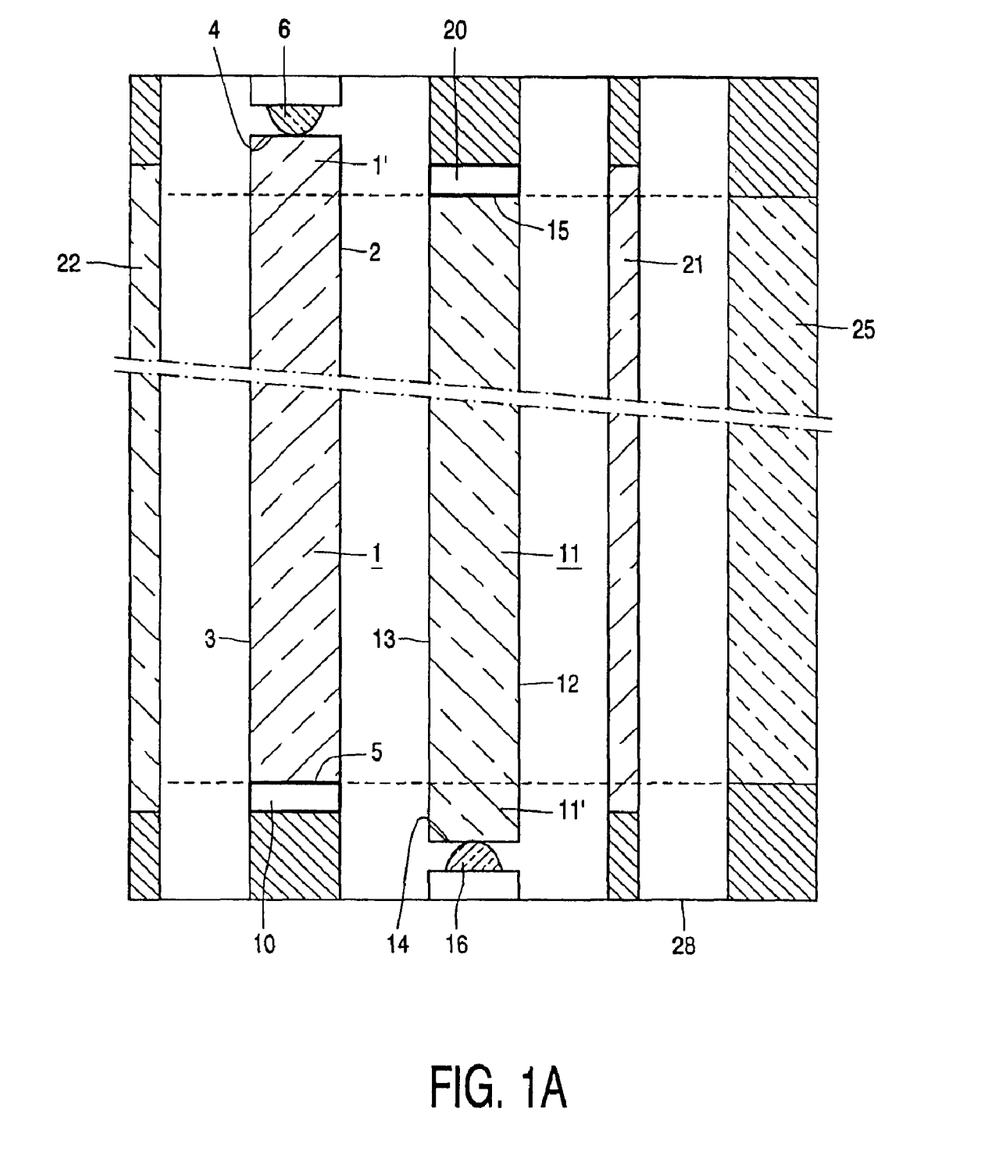
FIG. 1A is a cross-sectional view of a display device comprising an embodiment of the illumination system in accordance with the invention.

FIG. 1A is a cross-sectional view of an embodiment of an illumination system in accordance with the invention. The illumination system comprises a light-emitting panel 1; 11 of a light-transmitting material. The panel 1; 11 is made from, for example, a synthetic resin, acryl, polycarbonate, PMMA, such as Perspex, or glass. In operation, light is transported through the panel 1; 11 under the influence of total internal reflection. The panel 1; 11 has a front wall 2; 12 and a rear wall 3; 13 opposite said front wall. Between the front wall 2; 12 and the rear wall 3; 13 there are edge areas 4, 14; 5, 15. In the example shown in FIG. 1A, the edge area referenced 4; 14 is light-transmitting, and at least one light source 6; 16 is associated therewith. In operation, light originating from the light source 6; 16 is incident on the light-transmitting edge area 4; 14 and diffuses in the panel 1; 11.

In an alternative embodiment of the illumination system, also the edge area referenced 5; 15 is light-transmitting, and a further light source is associated therewith.

Figure 1B:
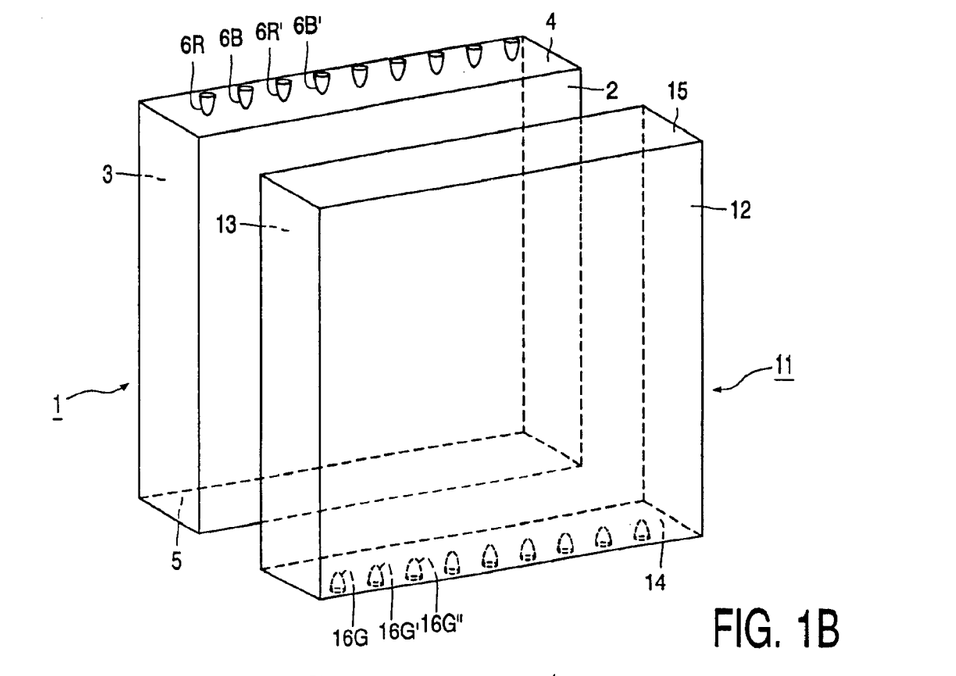
FIG. 1B is a perspective view of a detail of an embodiment of the illumination system shown in FIG. 1A.

In accordance with the invention, the illumination system comprises at least two light-emitting panels 1, 11, said panels 1, 11 being arranged one behind the other so as to be at least substantially parallel (also see FIG. 1B). In operation, the light-emitting panels 1, 11 emit light in the direction of the display device, for example a liquid crystal display (LCD) device 25. For this purpose, the rear walls 3, 13 of each of the light-emitting panels 1, 11 are provided with means (not shown in FIG. 1A) for coupling light out of the light-emitting panel 1, 11. These means comprise (patterns of) deformations and include, for example, screen printed dots, wedges and/or ridges. The means are provided in the rear wall of the panel 1, 11 by means of, for example, printing, pressing, etching, scribing or sandblasting. In an alternative embodiment, the deformations are provided in the front wall 2, 12 of the light-emitting panel 1, 11. The means couple light out of the light-emitting panel 1, 11 by reflection, scattering and/or refraction. The means for coupling out light are generally non-uniformly distributed over the rear wall of the relevant light-emitting panel, i.e. they are provided at a predetermined gradient allowing light to be coupled out of the relevant illumination system as uniformly as possible.

It is to be noted that light originating from the first light-emitting panel propagates through the second light-emitting panel in order to reach the display device. The transmission of the second, and if necessary third, light-emitting panel influences the mixing of the light at the location of the display device. Preferably, the means for coupling out light comprise diffusely transmissive coupling-out members in the light-emitting panels, which coupling-out members are arranged, for example, by surface roughening in the rear wall of the relevant light-emitting panel. Furthermore, preferably, the change of the distribution of said coupling-out members over the light-emitting panels is oppositely directed. In other words, the coupling-out coefficient for determining the degree to which light is coupled out of the relevant light-emitting panel increases in the first light-emitting panel in a certain direction and decreases in the second light-emitting panel in the same direction.

In order to make sure that light is satisfactorily mixed at the location of the display device (for setting the desired color temperature and color rendition of the light), preferably, the gradients of the distributions of the coupling-out members in the light-emitting panels are matched. In general, the coupling-out members in the second light-emitting panel will influence or attenuate the passage of light originating from the first light-emitting panel. This can be compensated by influencing or increasing the light coupled out of the first light-emitting panel in a suitable manner, for example by adapting the distribution and/or density of the coupling-out members in the first light-emitting panel. In general, using an iterative process, the regulation of the light transmission by the light-emitting panels will be improved.

The means for coupling out light serve as a secondary light source. A specific optical system may be associated with said secondary light source, which optical system is provided, for example, on the front wall 2; 12 (not shown in FIG. 1A). The optical system may be used, for example, to produce a broad light beam.

The light-emitting panel referenced 11, which is closest to the display device 25, allows passage of the light originating from the light-emitting panel referenced 1, which is situated on the side of the light-emitting panel 11 facing away from the display device 25. In the example shown in FIG. 1A, the light-transmitting edge areas 4, 14 are situated on opposite sides of the first and the second light-transmitting panel 1, 11. In this manner, any influence of the light originating from gradients in the distribution of the means for coupling light out of the light-emitting panel 1; 11 can be compensated since the gradients run in the same (yet opposite) direction.

The light source 6; 16 comprises a plurality of light-emitting diodes (LEDs) (also see FIG. 1B). The source brightness of LEDs is many times that of fluorescent tubes. In addition, when use is made of LEDs, the efficiency with which light is coupled into the panel is higher than in the case of fluorescent tubes. The use of LEDs as a light source has the advantage that the LEDs are allowed to contact panels made of a synthetic resin. LEDs hardly emit heat in the direction of the light-emitting panel 1; 11 and do not emit detrimental (UV) radiation. The use of LEDs has the additional advantage that means for coupling light originating from the LEDs into the panel can be dispensed with. The application of LEDs preferably leads to a more compact illumination system.

In FIG. 1A, an optional (polarizing) diffuser 21 and a reflecting diffuser 22 are shown, which bring about further mixing of the light originating from the light-emitting panels 1; 11. FIG. 1A further diagrammatically shows a display device, preferably a LCD panel, bearing reference numeral 25. The assembly of the panels 1, 11, the light source 6, 16, the diffuser 21, the display device 25 and a housing 28 forms a display device for displaying, for example, (video) images.

In FIG. 1A, each light-emitting panel 1, 11 is further provided with a sensor 10, 20 for measuring the optical properties of the light which, in operation, is emitted by the light source 6, 16. This sensor 10, 20 is coupled to control electronics (not shown in FIG. 1A) for suitably adapting the luminous flux of the light source 6, 16. By means of the sensor 10, 20 and the control electronics, a feedback mechanism can be formed which is used to influence the quality and the quantity of the light coupled out of the light-emitting panel 1, 11.

In the example shown in FIG. 1A, the LEDs contact the light-transmitting edge area 4, 14. The first part of the light-emitting panel 1; 11, referenced 1'; 11', is used to mix the light originating from the LEDs. Instead of three types/colors of LEDs, i.e. blue, green and red LEDs, maximally two types/colors of LEDs are associated with the light-emitting panel 1; 11, as a result of which the length necessary to mix the different colors is reduced substantially, so that a more compact (image) display device is obtained. In an alternative embodiment of the illumination system, the light is mixed in a separate light-mixing chamber which is preferably filled with air.

FIG. 1B is a very diagrammatic, perspective view of a detail of an embodiment of the illumination system shown in FIG. 1A. Light originating from a plurality of LEDs 6R, 6B, 6R', 6B', . . . ; 16G, 16G', 16G", . . . is coupled into the panel 1, 11 via the light-transmitting edge area 4, 14.

In the example shown in FIG. 1B, LEDs of two different colors, i.e. red LEDs 6R, 6R', . . . and blue LEDs 6B, 6B', . . . are associated with the light-transmitting panel bearing reference numeral 1, and LEDs of a color that differs from that of the LEDs associated with the light-transmitting panel bearing reference numeral 1, i.e. green LEDs 16G, 16G', 16G", . . . are associated with the light-transmitting panel bearing reference numeral 11. If light is suitably mixed by the light-emitting panels 1; 11, the display device 25 is illuminated with white light. By suitably controlling the LEDs, the light level and/or the color temperature of the light incident on the display device 25 can be regulated.

Figure 1C:
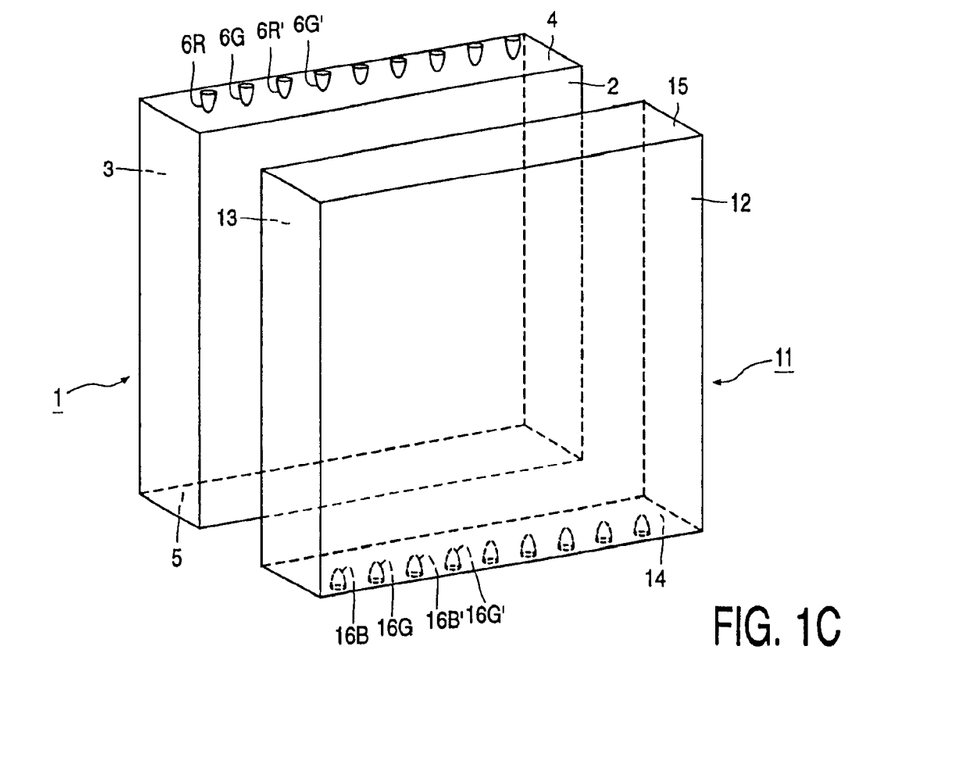
FIG. 1C is a perspective view of a detail of an alternative embodiment of the illumination system shown in FIG. 1A.

FIG. 1C is a very diagrammatic, perspective view of a detail of an embodiment of the illumination system shown in FIG. 1A. Light originating from a plurality of LEDs 6R, 6G, 6R', 6G', . . . ; 16B, 16G, 16B', 16G', . . . is coupled into the light-emitting panel 1, 11 via the light-transmitting edge area 4, 14.

In the example shown in FIG. 1C, LEDs of two different colors, i.e. red LEDs 6R, 6R40 , . . . and green LEDs 6G, 6G', . . . are associated with the light-transmitting panel bearing reference numeral 1, and LEDs partly comprising LEDs of a color that differs from that of the LEDs associated with the light-transmitting panel bearing reference numeral 1, i.e. green and blue LEDs 16B, 16G, 16B', 16G', . . . , are associated with the light-transmitting panel bearing reference numeral 11. If the light is suitably mixed by the light-emitting panels 1; 11, the display device 25 is illuminated with white light. By suitably controlling the LEDs, the light level and/or the color temperature of the light incident on the display device 25 can be regulated.

In an alternative embodiment, also amber and/or cyan-colored LEDs having a comparatively high light output may be used.

In an alternative embodiment, also red LEDs may be used in combination with blue LEDs provided with a phosphor, as a result of which the latter emit in two spectral bands, i.e. one blue band and one green band. By virtue thereof, only two panels are necessary, the first panel being provided with phosphor-coated LEDs and the second panel being provided with red LEDs, thus enabling the use of a single type of LED per panel. If only a single panel is used, then, in this case, only two types of LEDs are necessary.

The LEDs used preferably each have a luminous flux of at least 5 lm. LEDs having such a high output are alternatively referred to as LED power packages. Examples of power LEDs are "Luxeon™"-type LEDs (Lumileds), the luminous flux per LED being 35 lm for red LEDs, 20 lm for green LEDs, 8 lm for blue LEDs and 40 lm for amber LEDs.

Preferably, the LEDs are mounted on a (metal-core) printed circuit board. If power LEDs are provided on such a (metal-core) printed circuit board (PCB), the heat generated by the LEDs can be readily dissipated by thermal conduction via the PCB. In an interesting embodiment of the illumination system, the (metal-core) printed circuit board is in contact with the housing of the display device via a heat-conducting connection.

Figure 2A:
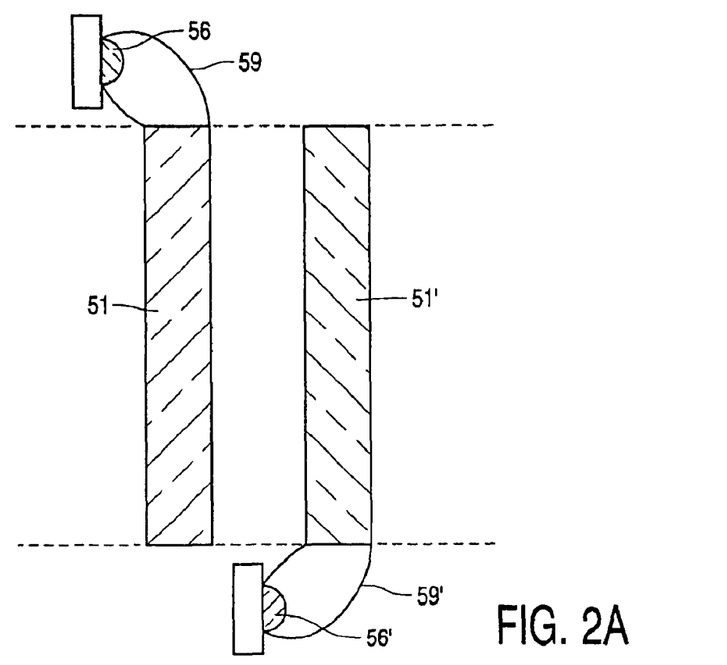
FIG. 2A is a sectional view of a detail of an alternative embodiment of the illumination system.

FIG. 2A is a very diagrammatic, sectional view of a detail of an alternative embodiment of the illumination system. In this embodiment, the illumination system comprises two light-emitting panels 51; 51', which are each associated with LEDs 56; 56', the light originating from the LEDs 56; 56' being coupled into the light-emitting panels 51; 51' via a light-mixing chamber 59; 59'. Said light-mixing chamber 59; 59' preferably comprises an air-filled space provided with reflecting walls. In an alternative embodiment, the light-mixing chamber comprises a light-conducting material.

Figure 2B:
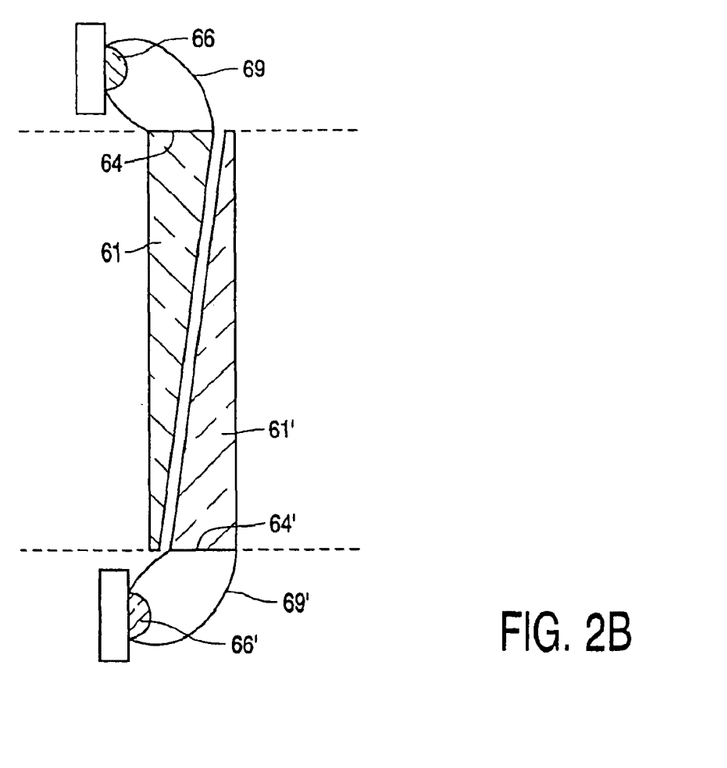
FIG. 2B is a sectional view of a detail of a further alternative embodiment of the illumination system.

FIG. 2B is a very diagrammatic, sectional view of a detail of a further alternative embodiment of the illumination system. In this particularly compact embodiment, the illumination system comprises two light-emitting panels 61; 61', which are each associated with LEDs 66; 66', the light originating from the LEDs 66; 66', being coupled into the light-emitting panels 61; 61' via a light-mixing chamber 69; 69'. In this embodiment, the light-emitting panels 61; 61' are not rectangular, but provided with an oblique side. The thickness of the light-emitting panels 61; 61' is preferably inversely proportional to the distance to the light-transmitting edge areas 64; 64'. The light-mixing chamber 69, 69' preferably comprises an air-filled space provided with reflecting walls. In an alternative embodiment, the light-mixing chamber comprises a light-conducting material.

Figure 3:
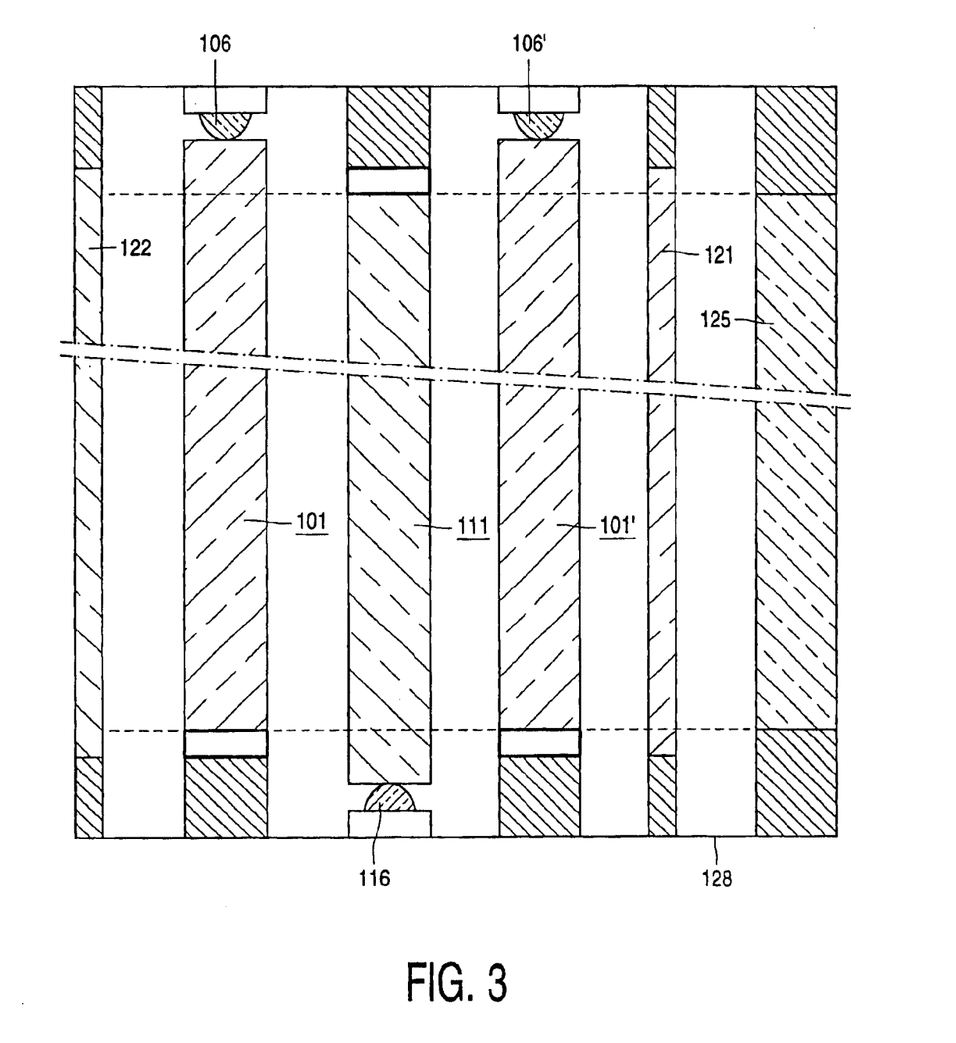
FIG. 3 is a cross-sectional view of a display device comprising a further embodiment of the illumination system in accordance with the invention.

FIG. 3 is a very diagrammatic, cross-sectional view of a display device comprising a further embodiment of the illumination system in accordance with the invention. In this embodiment, the illumination system comprises three light-emitting panels 101, 111, 101', which are each associated with a type of LEDs, for example a first light-emitting panel 101 is associated with exclusively blue LEDs 106, a second light-emitting panel 111 is associated with a plurality of exclusively green LEDs 116, and a third light-emitting panel 101' is associated with a plurality of exclusively red LEDs 106'.

FIG. 3 shows an optional (polarizing) diffuser 121 and a reflecting diffuser 122, which bring about further mixing of the light originating from the light-emitting panels 101, 111, 101'. FIG. 3 further diagrammatically shows a display device, preferably a LCD panel, bearing reference numeral 125. The assembly of the panels 101, 111, 101', the light source 106, 116, 106', the diffuser 121, the display device 125 and a housing 128 forms a display device for displaying, for example, (video) images.

It will be clear that, within the scope of the invention, many variations are possible to those skilled in the art.

The scope of protection of the invention is not limited to the examples given hereinabove. The invention is embodied in each novel characteristic and each combination of characteristics. Reference numerals in the claims do not limit the scope of protection thereof. The use of the verb "to comprise" and its conjugations does not exclude the presence of elements other than those mentioned in the claims. The use of the article "a" or "an" in front of an element does not exclude the presence of a plurality of such elements.

What is claimed is:

1. An illumination system for illuminating a display device, the illumination system comprising:
   first and second light-emitting panels arranged so as to be at least substantially parallel, each panel having a front wall, a rear wall situated opposite said front wall, and edge areas between the front wall and the rear wall,
   at least one of the edge areas of the first and second panels being light-transmitting,
   at least one light source in each panel being associated with its respective light-transmitting edge area, and
   in operation, light originating from the light source being incident on the light-transmitting edge area and spreading in the panel,
   characterized in that
   the light source associated with the light-transmitting edge area of the first light-emitting panel comprises first and second light-emitting diodes having respective first and second light emission wavelengths,
   the light source associated with the light-transmitting edge area of the second light-emitting panel comprises a third light-emitting diode having a third light emission wavelength, and
   the first, the second and the third light emission wavelength being different.

2. An illumination system as claimed in claim 1, characterized in that the light-transmitting edge areas are alternately situated at opposite sides of the first and the second light-transmitting panel.

3. An illumination system as claimed in claim 1, characterized in that
   the light source associated with the light-transmitting edge area of the first light-emitting panel comprises a plurality of red and blue light-emitting diodes, and
   the light source associated with the light-transmitting edge area of the second light-emitting panel comprises a plurality of green light-emitting diodes.

4. An illumination system as claimed in claim 1, characterized in that
   the light source associated with the light-transmitting edge area of the first light-emitting panel comprises a plurality of red and green light-emitting diodes, and
   the light source associated with the light-transmitting edge area of the second light-emitting panel comprises a plurality of blue and green light-emitting diodes.

5. An illumination system as claimed in claim 1, which further comprises control electronics for changing the luminous flux of the light-emitting diodes so as to adjust the color temperature of light produced by the illumination system to a desired value.

6. A display device comprising an illumination system as claimed in claim 1 optically coupled to a liquid crystal panel.

7. The illumination system as claimed in claim 1 which includes only the first and second light-emitting panels situated adjacent one another.

8. The illumination system as claimed in claim 1 wherein at least one of the light-emitting diodes includes a phosphor by which the light-emitted by said one light-emitting diode has a different light emission wavelength than that of the one light-emitting diode without such phosphor.

9. The illumination system as claimed in claim 1 wherein the light-emitting diodes comprise red (R), green (G) and blue (B) light-emitting diodes provided in a ratio of R:G:B of 2:1:1.

10. The illumination system as claimed in claim 9 wherein the first light-emitting panel includes a plurality of only red light-emitting diodes and the second light-emitting panel includes a plurality of alternately disposed green and blue light emitting diodes.

11. The illumination system as claimed in claim 1 wherein the light-emitting diodes comprise red (R), green (G) and blue (B) light-emitting diodes provided in a ratio of R:G:B of 1:1:2.

12. The illumination system as claimed in claim 11 wherein the first light-emitting panel includes a plurality of alternately disposed red and green light-emitting diodes and the second light-emitting panel includes the plurality of only blue light-emitting diodes.

13. The illumination system as claimed in claim 1 wherein the light source associated with the second light-emitting panel further comprises a fourth light emitting diode.

14. An illumination system for illuminating a display device, the illumination system comprising:
   a first light-emitting panel, a second light-emitting panel and a third light-emitting panel, said first, second and third light-emitting panels arranged so as to be substantially parallel, each panel having a front wall, a rear wall situated opposite said front wall, and edge areas between the front wall and the rear wall,
   at least one of the edge areas of the first, second and third panels being light-transmitting,
   at least one light source in each panel being associated with its respective light-transmitting edge area, and
   in operation, light originating from the light source being incident on the light-transmitting edge area and spreading in the panel
   the light source associated with the light-transmitting edge area of the first light-emitting panel comprising a light-emitting diode having a first light emission wavelength,
   the light source associated with the light-transmitting edge area of the second light-emitting panel comprising a light-emitting diode having a second light emission wavelength,
   the light source associated with the light-transmitting edge area of the third light-emitting panel comprising a light-emitting diode having a third light emission wavelength, and
   the first, the second and the third light emission wavelength are different.

15. An illumination system as claimed in claim 14, characterised in that the light-transmitting edge areas are alternately situated at opposite sides of the light-emitting panels.

16. An illumination system as claimed in claim 14, characterised in that
   the light source associated with the light-transmitting edge area of the first light-emitting panel comprises a plurality of red light-emitting diodes, the light source associated with the light-transmitting edge area of the second light-emitting panel comprises a plurality of green light-emitting diodes, and the light source associated with the light-transmitting edge area of the third light-emitting panel comprises a plurality of blue light-emitting diodes.

17. The illumination system as claimed in claim 14 which includes only the first, second and third light-emitting panels situated adjacent one another in a sandwiched-type arrangement.

18. An illumination system for illuminating a display device, the illumination system comprising:

first and second light-emitting panels arranged so as to be at least substantially parallel, each panel having a front wall, a rear wall situated opposite said front wall, and edge areas between the front wall and the rear wall, at least one of the edge areas of the first and second panels being light-transmitting, at least one light source in each panel being associated with its respective light-transmitting edge area, and in operation, light originating from the light source being incident on the light-transmitting edge area and spreading in the panel, the light source associated with the light-transmitting edge area of the first light-emitting panel comprising first and second light-emitting diodes having respective first and second light emission wavelengths, the light source associated with the light-transmitting edge area of the second light-emitting panel comprising a third light-emitting diode having a third light emission wavelength, and the first, the second and the third light emission wavelength being different, wherein the light-emitting diodes comprise red (R), green (G) and blue (B) light-emitting diodes provided in a ratio of R:G:B of 2:1:1.

19. The illumination system as claimed in claim 18 wherein the first light-emitting panel includes a plurality of only red light-emitting diodes and the second light-emitting panel includes a plurality of alternately disposed green and blue light emitting diodes.

20. The illumination system as claimed in claim 18 wherein the light-emitting diodes comprise red (R), green (G) and blue (B) light-emitting diodes provided in a ratio of R:G:B of 1:1:2.

21. The illumination system as claimed in claim wherein the first light-emitting panel includes a plurality of alternately disposed red and green light-emitting diodes and the second light-emitting panel includes the plurality of only blue light-emitting diodes.

22. An illumination system for illuminating a display device, the illumination system comprising:

first and second light-emitting panels arranged so as to be at least substantially parallel, each panel having a front wall, a rear wall situated opposite said front wall, and edge areas between the front wall and the rear wall, at least one of the edge areas of the first and second panels being light-transmitting, at least one light source in each panel being associated with its respective light-transmitting edge area, and in operation, light originating from the light source being incident on the light-transmitting edge area and spreading in the panel, the light source associated with the light-transmitting edge area of the first light-emitting panel comprising first and second light-emitting diodes having respective first and second light emission wavelengths, the light source associated with the light-transmitting edge area of the second light-emitting panel comprising a third light-emitting diode having a third light emission wavelength, and the first, the second and the third light emission wavelength being different, wherein the light source associated with the second light-emitting panel further comprises a fourth light emitting diode.

* * * * *